United States Patent
Kloper et al.

(10) Patent No.: US 10,218,539 B2
(45) Date of Patent: Feb. 26, 2019

(54) FORWARDING DATA BETWEEN AN ARRAY OF BASEBAND UNITS AND AN ARRAY OF RADIO HEADS IN DISTRIBUTED WIRELESS SYSTEM USING TDM SWITCHES

(71) Applicant: Cisco Technology, Inc., San Jose, CA (US)

(72) Inventors: David S. Kloper, Santa Clara, CA (US); Brian D. Hart, Sunnyvale, CA (US); Dipankar B. Acharya, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 16 days.

(21) Appl. No.: 15/660,905

(22) Filed: Jul. 26, 2017

(65) Prior Publication Data
US 2019/0036737 A1 Jan. 31, 2019

(51) Int. Cl.
*H04L 12/64* (2006.01)
*H04L 12/46* (2006.01)
*H04W 16/02* (2009.01)
*H04W 24/02* (2009.01)
*H04W 88/10* (2009.01)

(52) U.S. Cl.
CPC .............. *H04L 12/64* (2013.01); *H04L 12/46* (2013.01); *H04W 16/02* (2013.01); *H04W 24/02* (2013.01); *H04W 88/10* (2013.01)

(58) Field of Classification Search
CPC ........ H04L 12/64; H04L 12/46; H04W 16/02; H04W 24/02; H04W 88/10
See application file for complete search history.

(56) References Cited

U.S. PATENT DOCUMENTS

| | | | | |
|---|---|---|---|---|
| 5,305,308 A | * | 4/1994 | English | H04W 36/18 370/335 |
| 5,982,783 A | * | 11/1999 | Frey | H04Q 11/0478 370/395.6 |
| 6,822,960 B1 | * | 11/2004 | Manchester | H04L 12/5601 370/394 |
| 6,944,153 B1 | * | 9/2005 | Buckland | H04L 49/606 370/329 |
| 7,103,041 B1 | | 9/2006 | Speiser et al. | |
| 7,457,285 B1 | | 11/2008 | Parrish et al. | |
| 2004/0190504 A1 | | 9/2004 | Bansal | |
| 2004/0246891 A1 | * | 12/2004 | Kay | H04L 27/0008 370/215 |
| 2007/0143810 A1 | | 6/2007 | Yousef | |
| 2009/0129332 A1 | * | 5/2009 | Dayal | H04B 7/2615 370/330 |

\* cited by examiner

*Primary Examiner* — Khaled M Kassim
(74) *Attorney, Agent, or Firm* — Patterson + Sheridan, LLP

(57) ABSTRACT

The present disclosure discloses a distributed system. The distributed system includes a plurality of radio heads and a plurality of controllers disposed in one or more chassis external to the plurality of radio heads. Each of the plurality of controllers includes a baseband unit (BBU), an uplink time-division multiplexing (TDM) switch and a downlink TDM switch. The uplink TDM switch and the downlink TDM switch forward data bits between a radio head and a BBU by using TDM cells which may reduce latency relative to using Ethernet frames.

17 Claims, 9 Drawing Sheets

FORWARDING DATA BETWEEN AN ARRAY OF BASEBAND UNITS AND AN ARRAY OF RADIO HEADS IN DISTRIBUTED WIRELESS SYSTEM USING TDM SWITCHES

BACKGROUND

Access points (APs) used in Wi-Fi networks include a Media Access Control (MAC), a baseband unit (BBU), and a Radio Frequency (RF) transceiver. The BBU transmits baseband signals to the radio. The radio converts the baseband signals to wireless signals and transmits the wireless signals to client devices. Communication between the BBU and the radio needs very low latency (e.g., less than 10 microseconds) to be compliant with the 802.11 standard.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
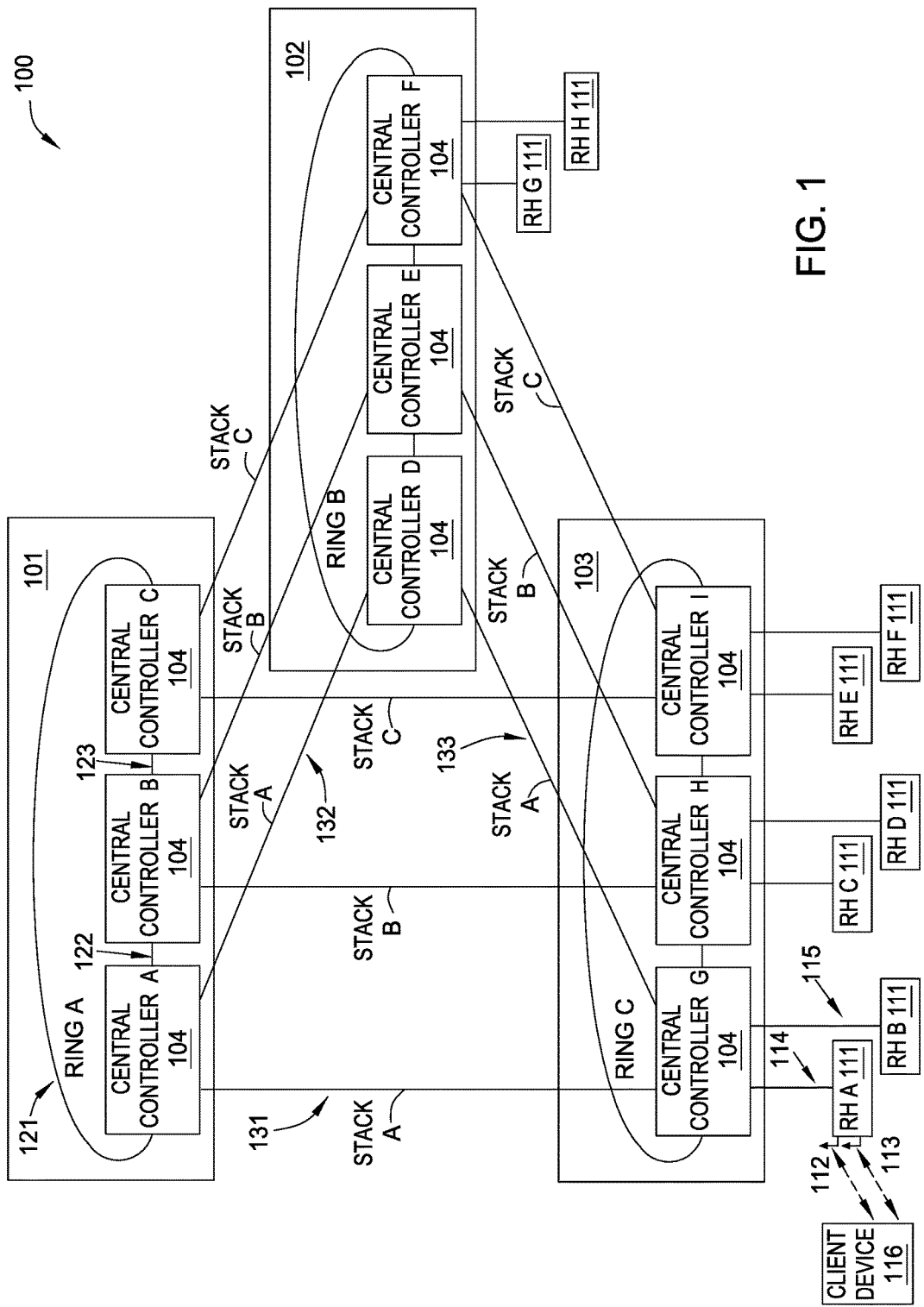
FIG. 1 shows a distributed system, according to one embodiment herein.

One embodiment of the present disclosure provides a system. The system includes a plurality of radio heads, wherein each of the plurality of radio heads comprises at least one antenna and at least one transceiver. The system also includes a plurality of controllers disposed in one or more chassis external to the plurality of radio heads. Each of the plurality of controllers comprises: a BBU and an uplink time-division multiplexing (TDM) switch coupled to (i) at least a first radio head of the plurality of radio heads, (ii) the BBU in the controller, and (iii) at least one uplink TDM switch in a different controller of the plurality of controllers. The uplink TDM switch is configured to: receive a first TDM cell based on signals received from the first radio head, wherein the first TDM cell comprises a first plurality of TDM data slots, and wherein a destination of each of the first plurality of TDM data slots is predetermined; generate a second TDM cell based on the first TDM cell, wherein the second TDM cell comprises a second plurality of TDM data slots, and wherein a destination of each of the second plurality of TDM data slots is predetermined; forward data bits in a first slot of the first plurality of TDM data slots to the BBU in the controller; and forward data bits in a second slot of the first plurality of TDM data slots in the second TDM cell to the at least one uplink TDM switch in the different controller.

One embodiment of the present disclosure provides integrated circuit. The integrated circuit includes a BBU and an uplink time-division multiplexing (TDM) switch coupled to (i) at least a first radio head, (ii) the BBU in the integrated circuit, and (iii) at least one uplink TDM switch in a different integrated circuit. The uplink TDM switch is configured to: receive a first TDM cell based on signals received from the first radio head, wherein the first TDM cell comprises a first plurality of TDM data slots, and wherein a destination of each of the first plurality of TDM data slots is predetermined; generate a second TDM cell based on the first TDM cell, wherein the second TDM cell comprises a second plurality of TDM data slots, and wherein a destination of each of the second plurality of TDM data slots is predetermined; forward data bits in a first slot of the first plurality of TDM data slots to the BBU in the integrated circuit; and forward data bits in a second slot of the first plurality of TDM data slots in the second TDM cell to the at least one uplink TDM switch in the different integrated circuit.

One embodiment of the present disclosure provides a controller. The controller includes a BBU and a memory containing a program that, when executed on the BBU, performs an operation. The operation comprises: receiving a first TDM cell based on signals received from a first radio head, wherein the first TDM cell comprises a first plurality of TDM data slots, and wherein a destination of each of the first plurality of TDM data slots is predetermined; generating a second TDM cell based on the first TDM cell, wherein the second TDM cell comprises a second plurality of TDM data slots, and wherein a destination of each of the second plurality of TDM data slots is predetermined; forwarding data bits in a first slot of the first plurality of TDM data slots to the BBU in the controller; and forwarding data bits in a second slot of the first plurality of TDM data slots in the second TDM cell to at least a different controller.

Example Embodiments

In one embodiment, the APs are part of a distributed system. The distributed system includes central controllers and radio heads (RHs) that are distributed at different physical locations. The RHs are usually connected to the central controllers through Ethernet links. Transmitting data through Ethernet links between a RH and a central controller using Ethernet frame format (e.g., IEEE 802.3 frame format) and delaying processing for the cyclic redundancy check (CRC) verification may introduce extra latency (e.g., several microseconds) that negatively impacts the client devices and compliance with the 802.11 Short Interframe Space (SIFS) and SLOT timing. For a system including distributed RHs, this provides implementation challenges not present in more traditional designs. When an array of RHs is connected to an array of BBUs, a means of forwarding waveforms between antennas of RHs and the desired BBU with low latency provides additional implementation challenges. The present disclosure provides embodiments for transmitting data between a RH and a central controller with very low latency, e.g., less than 9 microseconds.

FIG. 1 illustrates a distributed system 100, according to one embodiment herein. As shown in FIG. 1, the system 100 includes one or more chassis, e.g., the three chassis 101, 102 and 103. Each of the chassis includes one or more central controllers 104. For example, as shown in FIG. 1, the chassis 101 includes three central controllers 104, i.e., the central controller A, the central controller B and the central controller C. In one embodiment, multiple central controllers 104 are installed as a rack system in one chassis. In one embodiment, the central controllers 104 in one chassis are application-specific integrated circuits (ASICs) placed on a printed circuit board (PCB). In one embodiment, the central controllers 104 in one chassis are ASICs on different line cards. In one embodiment, the central controllers 104 can be firmware or combinations of software and hardware. For example, each of the central controllers 104 may include one or more processors and one or more memories containing one or more programs executed by the processor(s). In one embodiment, the central controllers 104 may include one or more processing units with physical borders.

In one embodiment, each of the central controllers 104 directly connects with one or more RHs 111. As shown in FIG. 1, the central controller G has connections with two RHs 111, i.e., the RH A and the RH B. In one embodiment, each of the RHs 111 includes one or more antennas to communicate radio frequency (RF) wireless signals with one or more client devices. In FIG. 1, the RH A includes two antennas 112 and 113 to communicate RF signals with the client device 116. In one embodiment, the RHs are physical connected to the central controller through wired connections, e.g., Cat5e/6/6a Ethernet cables such as using 10GBASE-T/NBASE-T. In another embodiment they are connected through fiber-optic links using 10GBASE-SR/10GBASE-LR. The RH A and the RH B are physically connected to the central controller G through two Ethernet links 114 and 115, respectively. In one embodiment, the RHs are distributed at different geographic locations in an area, e.g., a building. For example, the RH A and the RH B may be located on two different floors in a building but are physically connected to the same central controller G.

In one embodiment, in the distributed system 100, functions of an AP are split into two parts. Each of the central controllers 104, e.g., the central controller G, provides part or all of the digital part of the physical (PHY) layer function for baseband processing (e.g., channel coding) and the media access control (MAC) layer function (e.g., collision avoidance) of an AP. In one embodiment, each of the central controllers 104 includes one or more BBUs for baseband processing. Each RH 111, e.g., the RH A, provides the analog part of the PHY layer function for transmitting and receiving RF signals in a frequency band, plus associated digital signal processing (e.g., up-sampling and Q-to-I calibration). For example, each RH 111 may include one or more radio transceivers.

In one embodiment, the central controllers 104 do not perform the analog part of the PHY layer function of an AP, i.e., only the RHs 111 include and perform the analog part of the PHY layer function of an AP, e.g., transmitting and receiving RF signals in a frequency band. In one embodiment, the RHs 111 do not perform the digital part of the PHY layer function and the MAC layer function of an AP, i.e., only the central controllers 104 include and perform the digital part of the PHY layer function and the MAC layer function of an AP. In one embodiment, part or all of the digital part of the PHY layer function may also be included in the RHs depending on system partitioning.

In one embodiment, the central controllers 104 are physically connected with each other so that the central controllers 104 can transmit data between each other. In one embodiment, the central controllers 104 that are in the same chassis are physically connected with each other to form a ring. For example, the central controllers A, B and C are in the same chassis 101 and are physically connected with each other to form a ring A. Similarly, the central controllers D, E and F in the chassis 102 are physically connected with each other to form a ring B, and the central controllers G, H and I in the chassis 103 are physically connected with each other to form a ring C.

In another embodiment, the central controllers 104 that are in different chassis are physically connected with each other for form a stack. For example, the central controllers A, D and G (which are all in different chassis) are physically connected with each other to form a stack A. Similarly, the central controllers B, E and H are physically connected with each other to form a stack B, and the central controllers C, F and I are physically connected with each other to form a stack C. That is, a stack connects multiple central controllers 104 that are each in different chassis. Having more than one stack, providing more than one forwarding path between two controllers not directly connected can be used to increase the available bandwidth, or provide paths with fewer hops over links and/or TDM switches in order to reduce latency.

In one embodiment, the central controllers 104 are physically connected with each other through wired connections. For example, as shown in FIG. 1, the central controllers A, B and C in the same chassis 101 are physically connected with each other using Ethernet links, high speed Serializer/Deserializer (SerDes), or other I/O interfaces to form the ring A. In one embodiment, the central controllers A and C are connected through at least one Ethernet link 121, the central controllers A and B are connected through Ethernet link 122, and the central controllers B and C are connected through Ethernet link 123. The central controllers 104 in ring B and ring C are connected by using Ethernet links in a similar way. In one embodiment, the Ethernet links connecting the central controllers in the same chassis are full duplex that can transmit data in two directions, e.g., from the central controller A to the central controller C and vice versa.

Similarly, the central controllers A, D and G in different chassis are physically connected with each other using Ethernet links to form the stack A. For example, the central controllers A and G are connected through at least one Ethernet link 131, the central controllers A and D are connected through at least one Ethernet link 132, and the central controllers D and G are connected through at least one Ethernet link 133. The central controllers 104 in stack B and stack C are connected using Ethernet links in a similar way. In one embodiment, the Ethernet links connecting the central controllers in the same stack are full duplex that can transmit data in two directions, e.g., from the central controller A to the central controller G and vice versa.

FIG. 1 shows only one embodiment. In other embodiments, the distributed system 100 can include a different number of chassis. And each chassis can include a different number of central controllers, which, in turn, can control a different number of RHs. Further, each RH can include a different number of antennas. The central controllers can connect with each other to form the rings and/or the stacks in different ways, as understood by an ordinary person in the art. The central controllers can connect with each other using different topologies. For example, the central controllers can connect with each other using a mesh topology or a hub-and-spoke CLOS topology, as understood by an ordinary person in the art.

In one embodiment, a central controller 104 generates and/or processes the data for the RHs 111 that are physically connected to it. For example, the central controller G generates baseband signals carrying data for the client devices.

In another embodiment, the central controller that generates and/or processes the data for a RH is not the central controller that the RH is physically connected to. For example, while the RH A is physically connected to the central controller G the signals provided by the RH A can be processed by the central controller I in the same chassis 103 or by the central controller C in a different chassis 101. That is, the data from the RH A may not be processed by the central controller G that is physically connected to the RH A. In another example, the signals received from all nearby RHs operating on the same frequency channel should be processed by the same central controller, although the nearby RHs may be physically connected to different central controllers. In one embodiment, the signals received using some antennas on the RH are processed by one central controller while the signals received from other antennas on the same RH are processed by a different central controller. For example, it is assumed that the antenna 112 on RH A serves the 2.4 GHz frequency band and the antenna 113 on RH A serves the 5 GHz frequency band. The signals received from the antenna 112 may be processed by the central controller G and the signals received from the antenna 113 may be processed by the central controller I.

In the present disclosure, a RH can be physically connected to any central controller, e.g., the central controller that is associated with the physical port connecting to the RH, while the data for the RH can be processed by a different central controller if desired, e.g., the central controller that is processing all the antennas on a specific channel. This is achieved by using the rings and the stacks shown in FIG. 1 that interconnect the central controllers 104 in the system 100.

Figure 2:
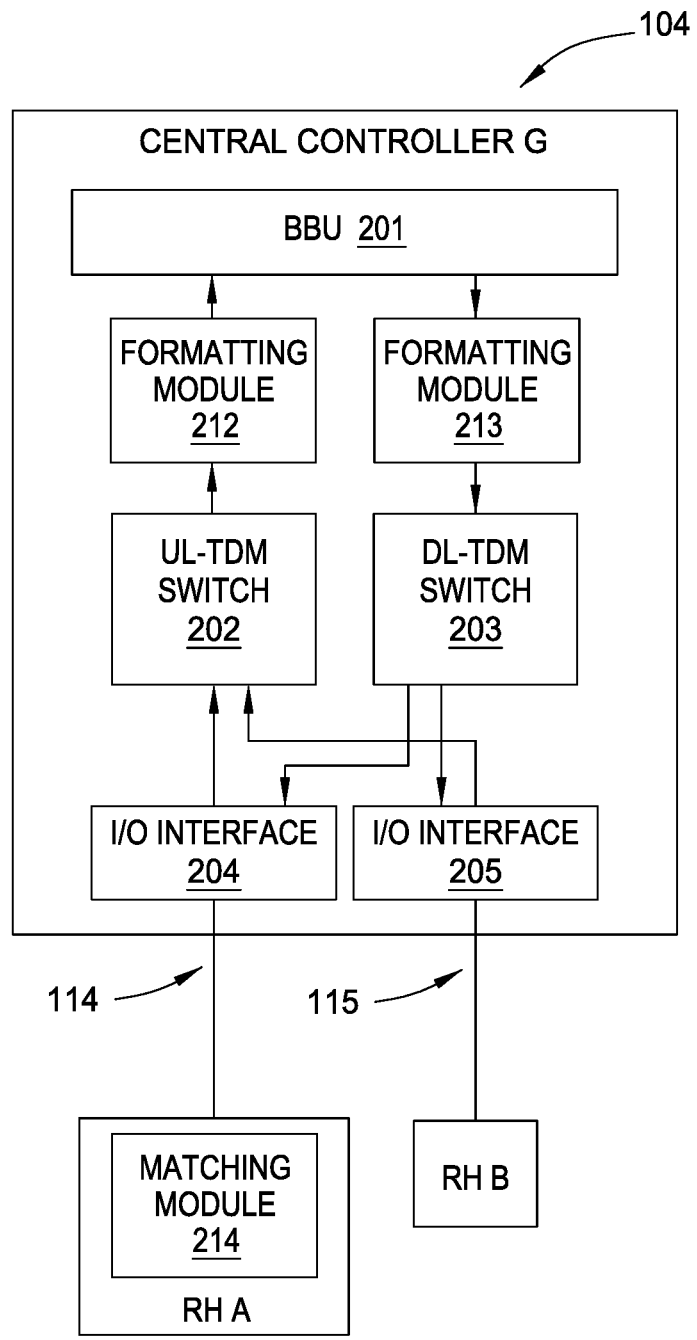
FIG. 2 shows a central controller, according to one embodiment herein.

FIG. 2 shows a central controller 104, according to one embodiment herein. In FIG. 2, the central controller 104 is the central controller G in FIG. 1 for explanation purpose. In one embodiment, the other central controllers 104 in the distributed system, e.g., the central controllers A and F in FIG. 1, are substantially the same as the central controller 104 shown in FIG. 2.

The central controller G includes a BBU 201 for baseband processing. In one embodiment, the BBU can be hardware circuits or a mixture of firmware and hardware capable of performing the baseband processing. The central controller G also includes an uplink time-division multiplexing switch (UL-TDM switch) 202 and a downlink time-division multiplexing switch (DL-TDM switch) 203. The central controller G further includes a respective I/O interface for each RH physically connected to the central controller G. For example, the central controller G includes I/O interface 204 for RH A and I/O interface 205 for RH B. In one embodiment, the I/O interfaces 204 and 205 can be RJ45 ports, e.g., 10 Gbit/s RJ45 ports. In another embodiment they may be Small Form-factor Pluggable (SFP) or SFP+ports (or similar) with various modules.

In one embodiment, the RH A is connected to the I/O interface 204 through an Ethernet link 114, e.g., a 10GBASE-T link. In one embodiment, the RH A transmits raw waveform data, e.g., uplink digitized analog signals to the UL-TDM switch 202 through the I/O interface 204. As shown in FIG. 2, the UL-TDM switch 202 transmits the uplink digitized signals as input TDM cells to a formatting module 212 between the UL-TDM switch 202 and the BBU 201. The formatting module 212 formats the input TDM cells into output TDM cells and transmits the output TDM cells to the BBU 201 or to an UL-TDM switch in a different central controller.

In one embodiment, the BBU 201 generates downlink baseband digital signals for a client device. The BBU 201 transmits the downlink baseband digital signals to the DL-TDM switch 203. As shown in FIG. 2, the BBU 201 transmits the downlink baseband digital signals to a formatting module 213 between the BBU 201 and the DL-TDM switch 203. The formatting module 213 formats the downlink baseband digital signals into TDM cells and transmits the TDM cells to the DL-TDM switch 203 as input TDM cells. The DL-TDM switch 203 places the received input TDM cells in corresponding output TDM cells and forwards the output TDM cells through the I/O interface 204 to the RH A 201 or to a DL-TDM switch in a different central controller. In one embodiment, each RH, e.g., the RH A 201, has a matching module 214 to convert the received TDM cells to digitized downlink analog signals which are transmitted to the client device.

FIG. 2 shows only one embodiment. In other embodiments, the central controller 104 can include multiple BBUs. In other embodiments, the central controller 104 can include other components such as memory elements. In other embodiments, the UL-TDM switch 202 and the DL-TDM switch 203 communicate data with the BBU 201 through one or more internal I/O interfaces. In other embodiments, the UL-TDM switch 202 and the DL-TDM switch 203 are the same switch or included in the same switch circuit. In other embodiments, the central controller 104 includes multiple UL-TDM switches. For example, the central controller 104 may include a first level UL-TDM switch and a second level UL-TDM switch. The RH A transmits uplink digital signals to the first level UL-TDM switch, which forwards the uplink digital signals to the second level UL-TDM switch. The second level UL-TDM switch transmits the uplink digital signals to the formatting module 212, which transmits TDM cells to the BBU 201. Similarly, in other embodiments, the central controller 104 includes multiple DL-TDM switches.

In the following, the raw waveform data, e.g., uplink or downlink digitized analog signals, transmitted between a RH and a BBU in a central controller is defined as a channel stream. That is, a channel stream is associated with two stream endpoints, i.e., a RH and a BBU in a central controller. An uplink channel stream is transmitted from a RH to a BBU. A downlink channel stream is transmitted from a BBU to a RH. The present disclosure provides embodiments for transmitting channel streams between a RH and the corresponding BBU (which may be disposed in a central controller that not directly connected to the RH) for processing the channel streams with very low latency, e.g., less than 10 microseconds. In the following figures, the formatting modules in the central controllers and the matching modules in the RHs are omitted for simplicity of illustration.

Figure 3A:
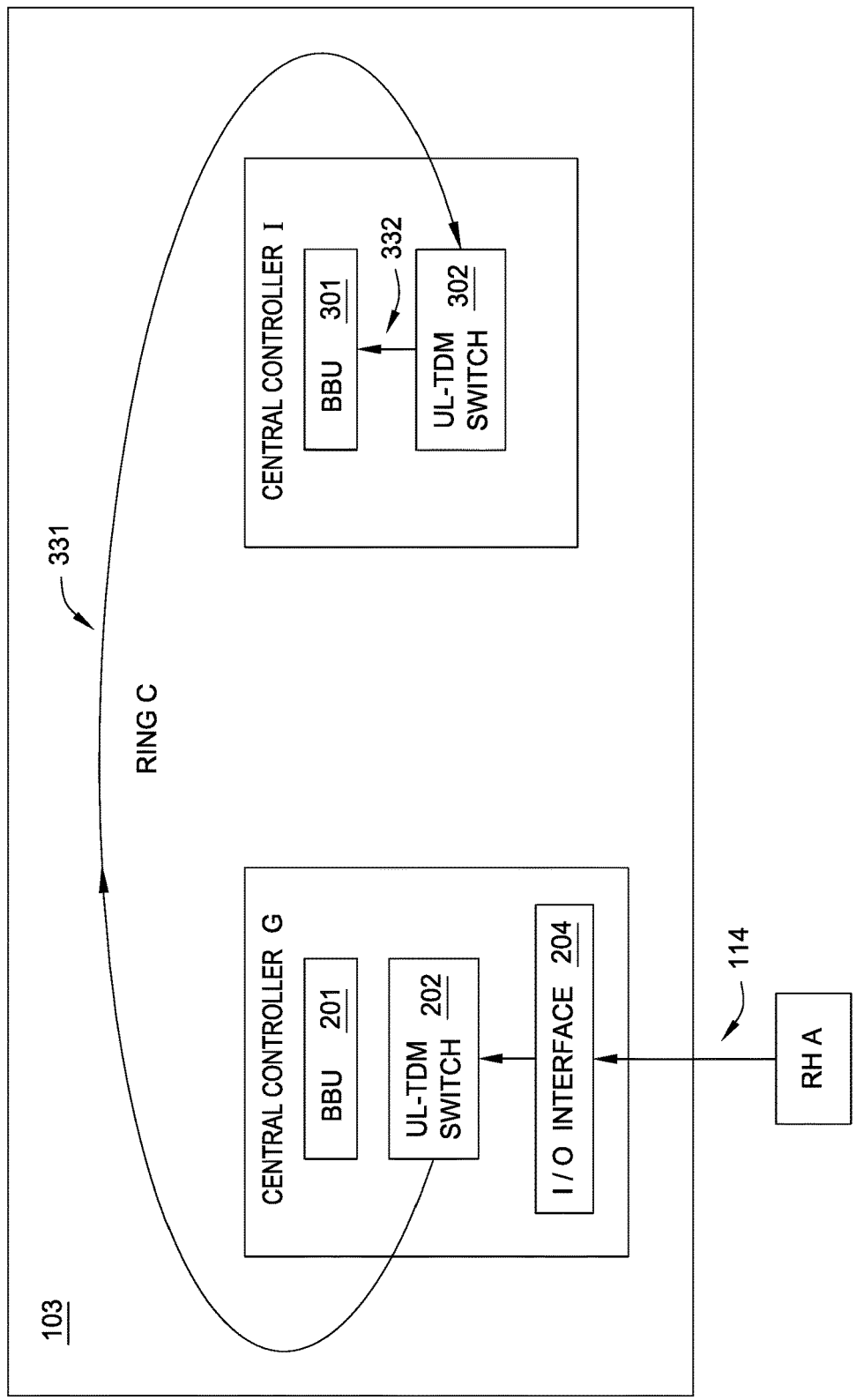
FIG. 3A shows the transmission of an uplink channel stream, according to one embodiment herein.

FIG. 3A shows the transmission of an uplink channel stream, according to a one embodiment herein. FIG. 3A shows an embodiment to transmit an uplink channel stream from the RH A connected to the central controller G in the chassis 103 to the BBU 301 of the central controller I in the same chassis 103. The RH A transmits the uplink channel stream to the UL-TDM switch 202 through the I/O interface 204 in the central controller G by using the Ethernet link 114. The UL-TDM switch 202 forwards the uplink channel stream to the UL-TDM switch 302 in the central controller I by using the Ethernet link 331. In one embodiment, the Ethernet link 331 is part of the ring C illustrated in FIG. 1. The UL-TDM switch 302 forwards TDM cells carrying the uplink digital signals to the BBU 301 in the central controller I through an internal connection 332. The BBU 301 processes the uplink digital signals for the RH A.

For simplicity of illustration, in FIG. 3A, the central controllers only show the UL-TDM switches and omit the DL-TDM switches. Also, for the central controller G, FIG. 3A only shows the RH A connecting to the central controller G and the I/O interface 104, and omits the RH B and the I/O interface 105. Moreover, FIG. 3A only shows the central controllers G and I in the chassis 103, and omits the central controller H in the chassis 103. In the following FIGS. 3B, 3C and 4, similar omissions are applied for simplicity of illustration.

Figure 3B:
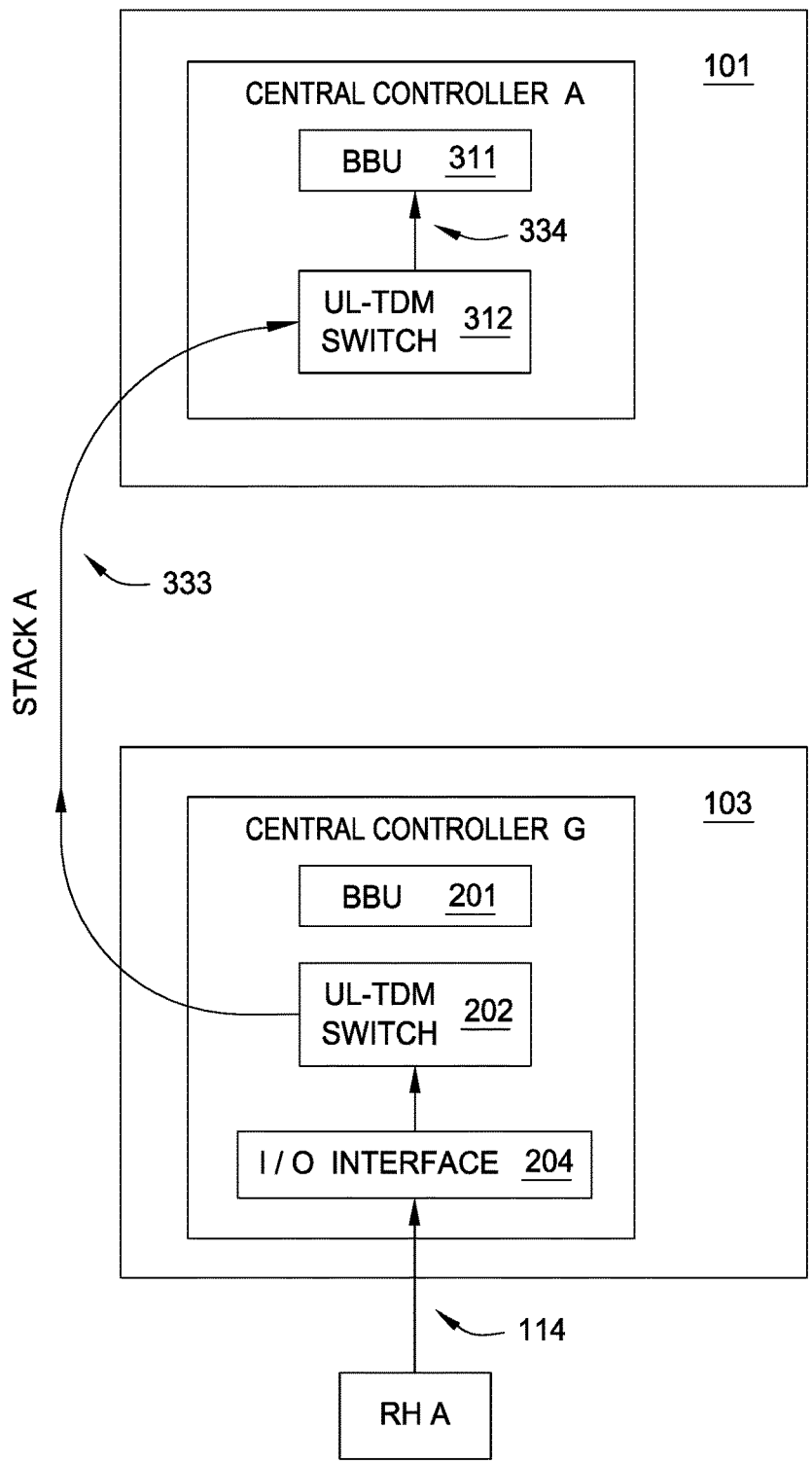
FIG. 3B shows the transmission of an uplink channel stream, according to another embodiment herein.

FIG. 3B shows the transmission of an uplink channel stream, according to a one embodiment herein. FIG. 3B illustrates transmitting an uplink channel stream from the RH A connected to the central controller G in the chassis 103 to the BBU 311 of the central controller A in a different chassis 101. The RH A transmits the uplink channel stream to the UL-TDM switch 202 through the I/O interface 204 in the central controller G by using the Ethernet link 114, similarly to FIG. 3A. The UL-TDM switch 202 forwards the uplink channel stream to the UL-TDM switch 312 in the central controller A using the Ethernet link 333. In one embodiment, the Ethernet link 333 is part of the stack A illustrated in FIG. 1. The UL-TDM switch 312 converts the uplink channel stream to uplink digital signals and forwards the uplink digital signals to the BBU 311 in the central controller A through an internal connection 334. The BBU 311 processes the uplink digital signals for the RH A.

Figure 3C:
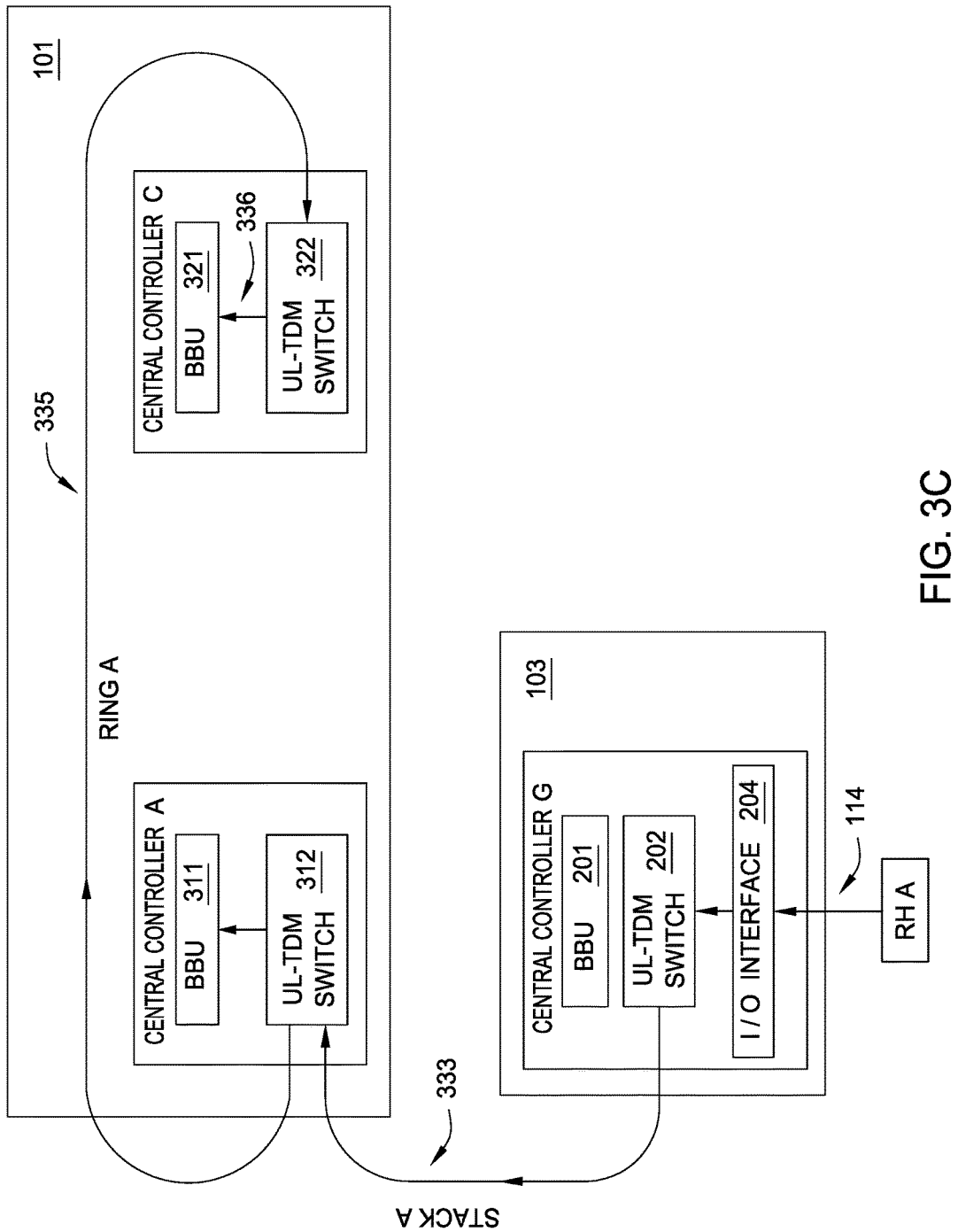
FIG. 3C shows the transmission of an uplink channel stream, according to another embodiment herein.

FIG. 3C shows the transmission of an uplink channel stream, according to a one embodiment herein. FIG. 3C illustrates transmitting an uplink channel stream from the RH A connected to the central controller G in the chassis 103 to the BBU 321 of the central controller C in a different chassis 101. The RH A transmits the uplink channel stream to the UL-TDM switch 202 through the I/O interface 204 in the central controller G by using the Ethernet link 114, similarly to FIG. 3A or FIG. 3B. The UL-TDM switch 202 forwards the uplink channel stream to the UL-TDM switch 312 in the central controller A by using the Ethernet link 333. The UL-TDM switch 312 forwards the uplink channel stream to the UL-TDM switch 322 in the central controller C using the Ethernet link 335. In one embodiment, the Ethernet link 335 is part of ring A. The UL-TDM switch 322 forwards TDM cells carrying the uplink digital signals to the BBU 321 in the central controller C through an internal connection 336 which processes the uplink digital signals for the RH A.

In one embodiment, the two stream endpoints associated with an uplink channel stream can be changed dynamically due to changes of load and/or RF environment. For example, FIG. 3A shows an embodiment to transmit an uplink channel stream from the RH A to the BBU 301 of the central controller I in the same chassis 103. Due to changes of load and/or RF environment, the uplink channel stream may instead be transmitted from the RH A to the BBU 311 of the central controller A in the chassis 101 for better global optimization of antenna usage. In this case, the UL-TDM switch 202 can forward the uplink channel stream from the RH A according to the change. In one embodiment, an uplink channel stream between two stream endpoints may be stopped due to changes of load and/or RF environment. For example the uplink channel stream transmitted from the RH A to the BBU 301 of the central controller I may not provide the best usage of limited resources and thus is not used. In this case, the UL-TDM switch 202 does not forward the uplink channel stream from the RH A to the BBU 301. In one embodiment, a new uplink channel stream is transmitted between two stream endpoints. For example, a new uplink channel stream is created between the RH A to the BBU in the central controller H in the same chassis 103. In this case, the central controller configures the UL-TDM switch to forward the new uplink channel stream from the RH A to the BBU in the central controller H. In another embodiment, the system 100 can dynamically adjust the forwarding path between the two stream endpoints in one or more TDM switches to accommodate new channel streams.

In one embodiment, each UL-TDM switch in the central controllers has a respective I/O interface, e.g., a 10 Gbit/s port, for each link connection of the UL-TDM switch to another UL-TDM switch (an inter-switch connection). For example, the UL-TDM switch 202 in the central controller G has a first I/O interface to connect to the Ethernet link 331 and a second I/O interface to connect to the Ethernet link 333. In another example, the UL-TDM switch 312 in the central controller A has a first I/O interface to connect to the Ethernet link 333 and a second I/O interface to connect to the Ethernet link 335.

In FIGS. 3A and 3B, the uplink channel stream is transmitted between two stream endpoints, i.e., the RH and the BBU processing the uplink channel stream, through only two UL-TDM switches in two central controllers via only one ring or only one stack. The transmission in FIG. 3A or 3B is defined as a one-hop switching, not counting the link between the first switch and the RH. In FIG. 3C, the uplink channel stream is transmitted from the RH to the BBU processing the uplink channel stream through three UL-TDM switches in three central controllers via both a ring and a stack. The transmission in FIG. 3C is defined as a two-hop switching. N-hop switching can be defined similarly, where N is zero or a positive integer. That is, if the uplink channel stream is transmitted between two stream endpoints through M UL-TDM switches in M central controllers, then N=M−1. In one embodiment, the uplink channel stream is transmitted between two stream endpoints using at most a two-hop switching. In other embodiments, the uplink channel stream is transmitted between two stream endpoints via one or more rings, one or more stacks or a combination of one or more rings and stacks.

Figure 4:
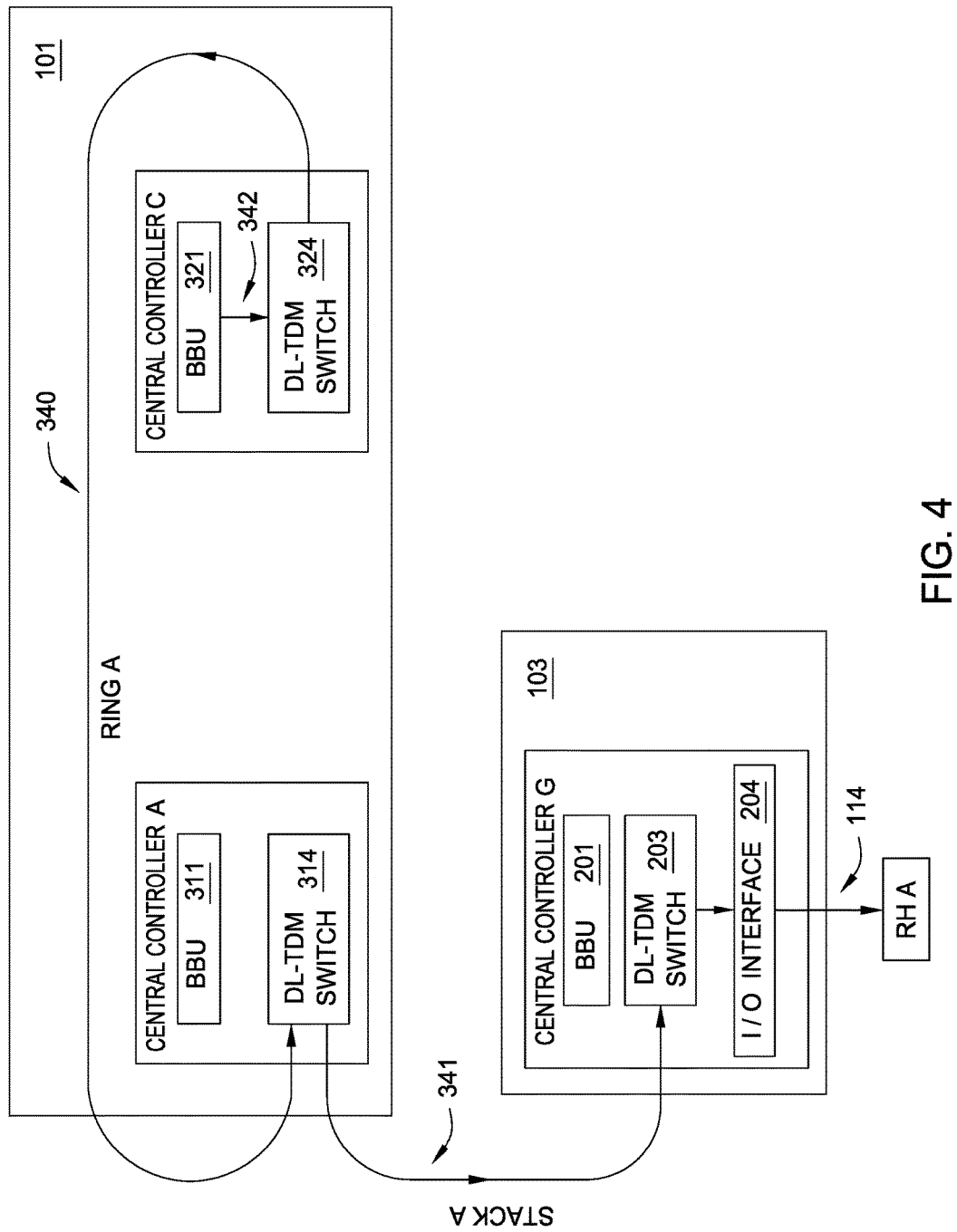
FIG. 4 shows the transmission of a downlink channel stream, according to one embodiment herein.

FIG. 4 shows the transmission of a downlink channel stream, according to a one embodiment herein. FIG. 4 illustrates transmitting a downlink channel stream from the BBU 321 of the central controller C in chassis 101 to the RH A physically connected to the central controller G in the chassis 103. The BBU 321 transmits the downlink baseband digital signals to the DL-TDM switch 324 through an internal connection 342. The DL-TDM switch 324 transmits the downlink channel stream (i.e., a stream of TDM cells) to the DL-TDM switch 314 in the central controller A by using the Ethernet link 340. The Ethernet link 340 in FIG. 4 is different from the Ethernet link 335 in FIG. 3C. In one embodiment, the Ethernet link 340 provides a part of the ring A. The DL-TDM switch 314 forwards the downlink channel stream to the DL-TDM switch 203 in the central controller G by using the Ethernet link 341. The Ethernet link 341 in FIG. 4 is different from the Ethernet link 333 in FIG. 3C. In one embodiment, the Ethernet link 341 is part of stack A in FIG. 1. The DL-TDM switch 203 forwards the digitized downlink analog signals through the I/O interface 204 to the RH A 201 for transmitting to the client device.

Similarly as described above, in one embodiment, the two stream endpoints associated with a downlink channel stream can be changed due to changes of load and/or RF environment. In other embodiments, a downlink channel stream may not be used, or a new downlink channel stream may be created. In these embodiments, the DL-TDM switch in each central controller can make adjustments accordingly.

In one embodiment, each DL-TDM switch in the central controllers has a respective I/O interface, e.g., a 10 Gbit/s port, for each link connection of the DL-TDM switch to another DL-TDM switch (an inter-switching connection). For example, the DL-TDM switch 314 in the central controller A has a first I/O interface to connect to the Ethernet link 340 and a second I/O interface to connect to the Ethernet link 341. In one embodiment, in each central controller, the I/O interfaces of the UL-TDM switch for inter-switching connections are different from the I/O interfaces of the DL-TDM switch for inter-switching connections. For example, in the central controller A, the two I/O interfaces of the UL-TDM switch 312 to connect to Ethernet links 335 and 333 are different from the two I/O interfaces of the DL-TDM switch 314 to connect to Ethernet links 340 and 341. On the other hand, in each central controller, the UL-TDM switch and the DL-TDM switch share the same I/O interface to connect to a RH, as described in FIG. 2 above.

In FIG. 4, the downlink channel stream is transmitted from the BBU generating the downlink channel stream to the RH through three DL-TDM switches in three central controllers via both a ring and a stack. That is, similarly as described above, the transmission in FIG. 4 is a two-hop switching. In one embodiment, the downlink channel stream is transmitted between two stream endpoints using at most a two-hop switching.

FIGS. 3A-3C and FIG. 4 only show a few embodiments. In other embodiments, a channel stream can be transmitted between any RH and any BBU of any central controller in the distributed system 100 similarly as described above. In other embodiments, the channel stream is transmitted between two stream endpoints using more than two-hop switching, e.g., a three-hop switching. In other embodiments, the RH itself can include an UL-TDM switch and/or a DL-TDM switch.

In one embodiment, in order to achieve very low latency for transmitting channel streams between two stream endpoints using Ethernet links, data is transmitted in the channel streams as TDM cells, as described in detail below.

Figure 5:
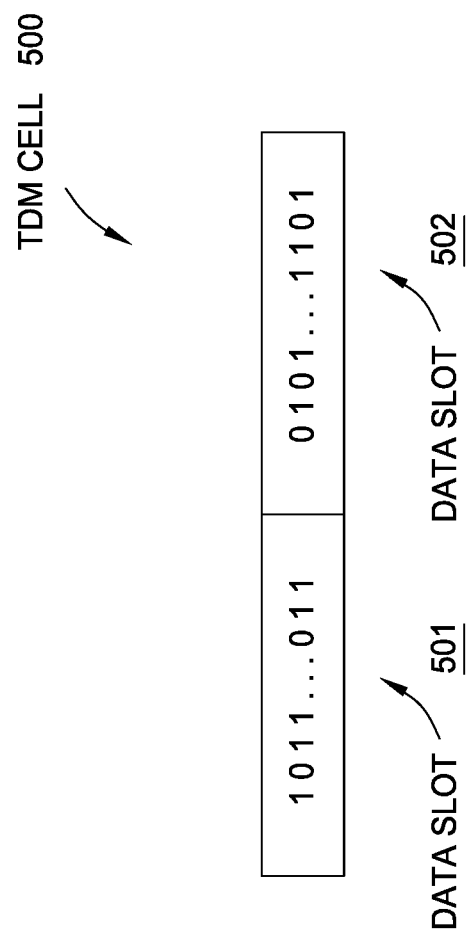
FIG. 5 shows a time-division multiplexing (TDM) cell, according to one embodiment herein.

FIG. 5 shows a TDM cell 500, according to one embodiment herein. As shown in FIG. 5, the TDM cell 500 includes a plurality of data bits that may be divided into a plurality of data slots, e.g., two data slots 501 and 502. Each data slot includes a plurality of bits, and the number of data bits in each data slot need be the same. In one embodiment, each data slot in the TDM cell 500 includes a channel stream corresponding to two stream endpoints in the distributed system 100, i.e., a RH and a BBU. That is, data bits in each data slot are transmitted between two stream endpoints. In the following, the transmission of the TDM cell 500 will be explained using one or more of FIGS. 1-4 above.

In one embodiment, each data slot in the TDM cell 500 includes an uplink channel stream transmitted from a same RH. For example, the RH A transmits digitized analog signals to the UL-TDM switch 202 in the central controller G that the RH A is physically connected to. The UL-TDM switch 202 generates one or more TDM cells 500 based on the received digitized analog signals from the RH A. Each of the data slots in a TDM cell 500 corresponds to an uplink data stream. For example, data bits in the data slot 501 are transmitted from the RH A to the BBU 201 in the central controller G. Data bits in the data slot 502 are transmitted from the RH A to the BBU 301 in the central controller I, as shown in FIG. 3A. Thus, after generating the TDM cell 500, the UL-TDM switch 202 forwards data bits in the data slot 501 to the BBU 201 in the central controller G. Also, the UL-TDM switch 202 forwards data bits in the data slot 502 to the UL-TDM switch 302 in the central controller I through the Ethernet link 331, as shown in FIG. 3A. In one embodiment, each channel stream corresponds to an end to end communication tunnel. In one embodiment, for transmitting multiple channel streams, each channel stream includes multiple data slots of varying sizes. In another embodiment, a channel stream is fragmented into a plurality of data slots that are sent over a plurality of I/O interfaces. In another embodiment, a channel stream is fragmented into a plurality of data slots that are sent in the same data slot in different TDM cells, to reduce TDM bandwidth required to forward slower sampling rates.

In another embodiment, each data slot in the TDM cell 500 includes a downlink channel stream generated by a same BBU. For example, the BBU 321 in the central controller C generates baseband digital signals and transmits the baseband digital signals to the DL-TDM switch 324. The DL-TDM switch 324 generates a TDM cell 500 based on the received baseband digital signals from the BBU 321. Each of the two data slots in the TDM cell 501 is corresponding to a downlink data stream. For example, data bits in the data slot 501 are transmitted from the BBU 321 to a RH physically connected to the central controller C. Data bits in the data slot 502 are transmitted from the BBU 321 to the RH A physically connected to the central controller G, as shown in FIG. 4. Thus, after generating the TDM cell 500, the DL-TDM switch 324 forwards data bits in the data slot 501 to the RH physically connected to the central controller C. Also, the DL-TDM switch 324 forwards data bits in the data slot 502 to the DL-TDM switch 314 through the Ethernet link 340, as shown in FIG. 4.

In one embodiment, the TDM cell 500 includes 124 bits. In one embodiment, most or all the bits in the TDM cell 500 are contiguous data bits. For example, the bits in the TDM cell 500 do not include overhead bits such as the bits indicating one or more source addresses transmitting the data bits, one or more destination addresses receiving the data bits or the CRC bits. That is, the TDM cell 500 does not have as many overhead bits as in an Ethernet frame and thus the latency of transmitting the TDM cell 500 is very low, while allowing each data slot to be forwarded to a different destination. In other words, TDM cells, instead of Ethernet frames, are transmitted between RHs and BBUs by using Ethernet links in the distributed system 100 to achieve very low latency.

In one embodiment, in each central controller, the UL-TDM switch and the DL-TDM switch is pre-configured by the central controllers to know where to forward the data bits in each data slot of the TDM cell 500. That is, the destination of each data slot 501, 502 is predetermined and known by the UL-TDM switch and the DL-TDM switch. In one embodiment, the UL-TDM switch and the DL-TDM switch can determine where to forward the data bits based on chronological or bit positions of the data bits or data slots in each TDM cell. For example, the UL-TDM switch 202 knows that bits 1-20 (the first data slot 501) in each TDM cell 500 over I/O interface 204 should be forwarded to the BBU 201 in the central controller G and bits 21-40 (the second data slot 502) in each TDM cell 500 over I/O interface 204 should be forwarded to the UL-TDM switch 302 in the central controller I through the Ethernet link 331. Thus, unlike in Ethernet frames, the central controller do not need to process header to determine the destination of the frame. Instead, which slot the data is located in determines where the data will be forwarded, which reduces the amount of time required to forward the TDM cell 500 in the channel streams. This can save both the time in determining the forwarding decision and the time to transfer the data used in determining the forwarding decision.

In one embodiment, information of the chronological positions indicating the destination can be pre-programmed into the UL-TDM switch and the DL-TDM switch. In another embodiment, each UL-TDM switch and each DL-TDM switch may include a respective predetermined transfer matrix indicating where the data bits are coming from and where the data bits should be forwarded to for each data slot in the TDM cells. In another embodiment, the TDM switch may contain a plurality of transfer matrices, with timestamps indicating when configuration changes will occur.

In another embodiment, in each central controller, the UL-TDM switch and the DL-TDM switch knows where to forward the data bits in each data slot of the TDM cell by using signaling bits in the TDM cell 500. For example, some bits in the TDM cell 500 can be signaling bits (not data bits) including information of the destination of each data slot in the TDM cell 500. The UL-TDM switch and/or the DL-TDM switch receive the signaling bits in the TDM cell and determine the destination of each data slot using the information included in the signaling bits. The signaling bits in the TDM cell 500 introduce less overhead than the overhead bits in an Ethernet frame. For example, the signaling bits in the TDM cell 500 can be one or two bits while the overhead bits in an Ethernet frame are typically several hundred bits.

Figure 6:
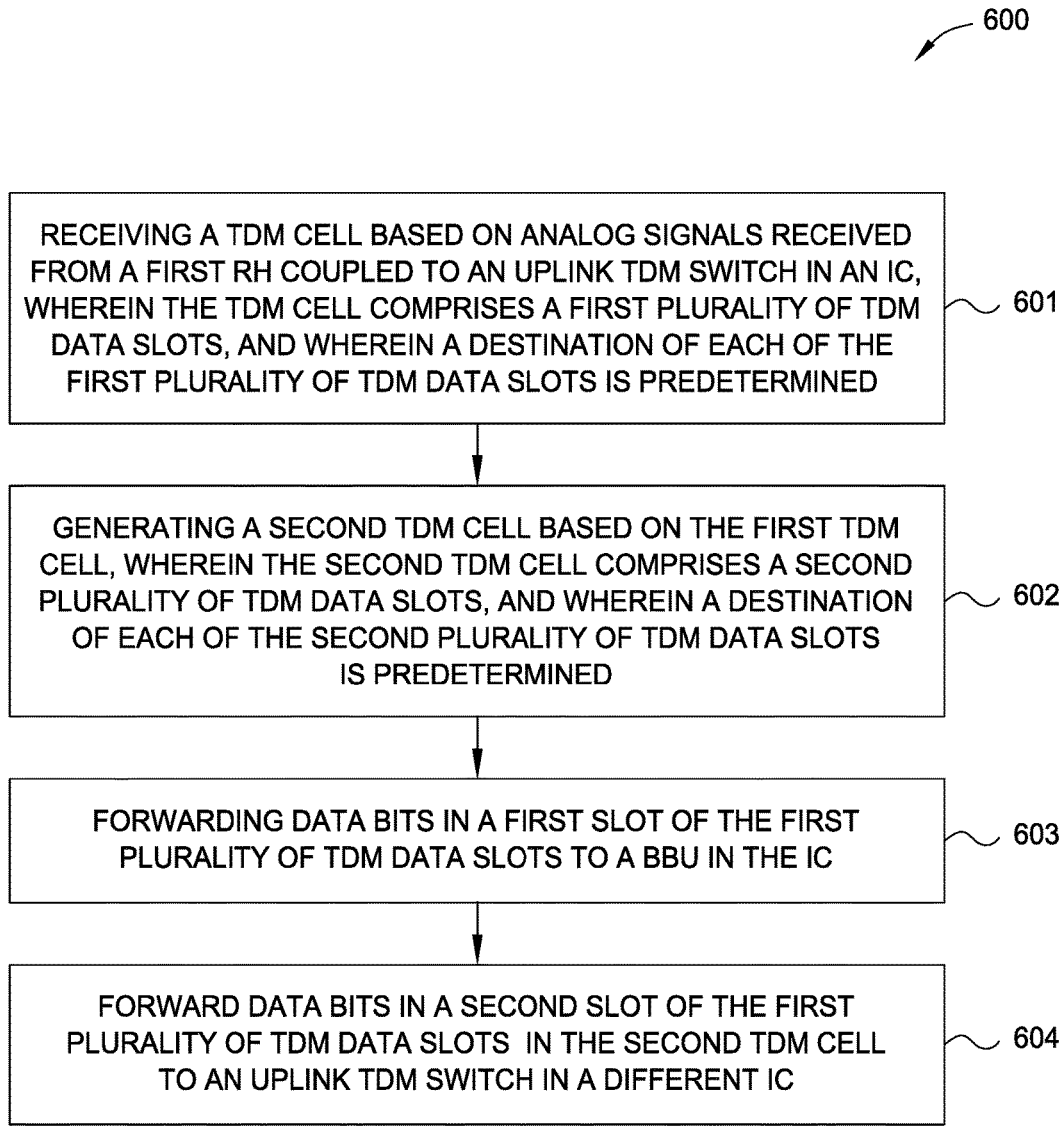
FIG. 6 shows a flowchart chart of a method for switching an uplink channel stream, according to one embodiment herein.

FIG. 6 shows a flowchart chart of a method 600 for switching an uplink channel stream, according to one embodiment herein. At block 601, an UL-TDM switch receives a first TDM cell based on digitized analog signals received from a first RH coupled to the UL-TDM switch in an IC, wherein the first TDM cell comprises a first plurality of TDM data slots, and wherein a destination of each of the first plurality of TDM data slots is predetermined. For example, as described above, the UL-TDM switch 202 in the central controller G receives a first TDM cell 500 based on the received digitized analog signals from the RH A. The first TDM cell 500 includes data slot 501 and data slot 502 that have known destinations. The first TDM cell 500 is input to the UL-TDM switch 202 as an input TDM cell. At block 602, the UL-TDM switch generates a second TDM cell based on the first TDM cell, wherein the second TDM cell comprises a second plurality of TDM data slots, and wherein a destination of each of the second plurality of TDM data slots is predetermined. For example, the UL-TDM switch 202 generates a second TDM cell 500 as the corresponding output TDM cell based on the input TDM cell. At block 603, the UL-TDM switch forwards data bits in a first slot of the first plurality of TDM data slots to a BBU in the IC. For example, the UL-TDM switch 202 places data bits in the data slot 501 of the input TDM cell in the data slot 501 of the output TDM cell and forwards the data slot 501 of the output TDM cell to the BBU 201 in the central controller G. At block 604, the UL-TDM switch forwards data bits in a second slot of the first plurality of TDM data slots in the second TDM cell to an uplink TDM switch in a different IC. For example, the UL-TDM switch 202 places data bits in the data slot 502 of the input TDM cell in the data slot 502 of the output TDM cell and forwards the data slot 502 of the output TDM cell to the UL-TDM switch 302 in the central controller I through the Ethernet link 331.

Figure 7:
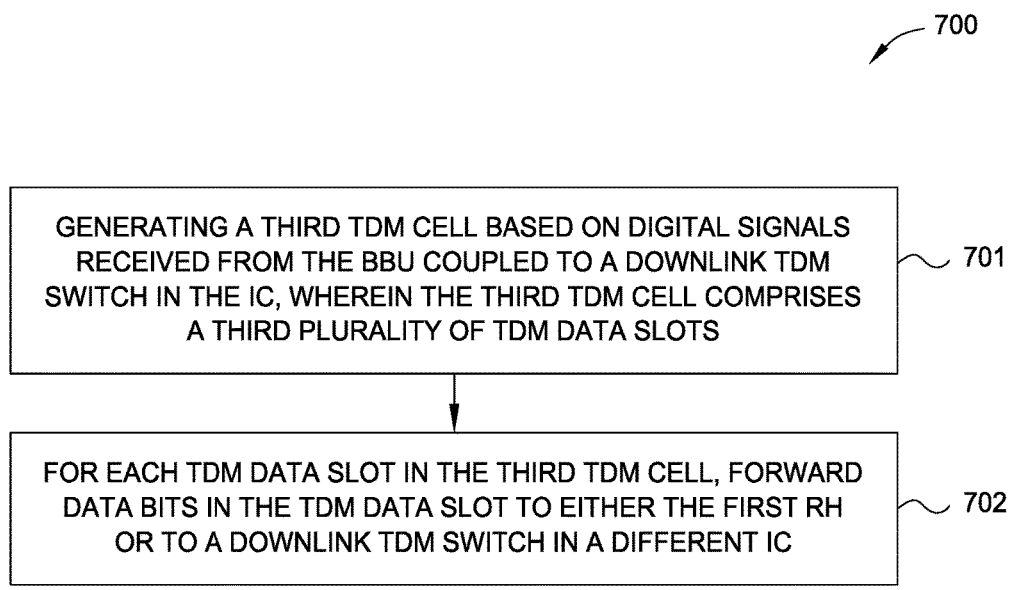
FIG. 7 shows a flowchart chart of a method for switching a downlink channel stream, according to one embodiment herein.

FIG. 7 shows a flowchart chart of a method 700 for switching a downlink channel stream, according to one embodiment herein. At block 701, a DL-TDM switch generates a third TDM cell based on digital signals received from the BBU coupled to the DL-TDM switch in the IC, wherein the third TDM cell comprises a third plurality of TDM data slots. For example, as described above, the DL-TDM switch 324 generates a third TDM cell 500 based on the received baseband digital signals from the BBU 321. The third TDM cell 500 includes data slot 501 and data slot 502. At block 702, for each TDM data slot in the third TDM cell, the DL-TDM switch forwards data bits in the TDM data slot to either the first RH or to a DL-TDM switch in a different IC. For example, the DL-TDM switch 324 forwards data bits in the data slot 501 to the RH physically connected to the central controller C. Also, the DL-TDM switch 324 forwards data bits in the data slot 502 to the DL-TDM switch 314 through the Ethernet link 340.

In one embodiment, TDM cells are transmitted over Ethernet links with different directions or destinations. In one embodiment, all the data slots in the TDM cells are either received on an Ingress port or sent on an Egress port. In one embodiment, all the data slots in the TDM cells either come directly from the sender as the original data source or pass through the sender which acts as a relay for the original data source. In one embodiment, all the data slots in the TDM cells are either transmitted directly to the receiver as the final destination or pass through the receiver which acts as a relay for the final destination. In one embodiment, the TDM switch (either the UL-TDM switch or the DL-TDM switch) receives data slots from Ingress TDM cells and places the received data slots in data slots of the Egress TDM cells.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic link), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission links, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

We claim:

1. A system, comprising:
   a plurality of radio heads, wherein each of the plurality of radio heads comprises at least one antenna and at least one transceiver;
   a plurality of controllers disposed in one or more chassis external to the plurality of radio heads, wherein each of the plurality of controllers comprises:
      a baseband unit (BBU);
      an uplink time-division multiplexing (TDM) switch coupled to (i) at least a first radio head of the plurality of radio heads, (ii) the BBU in the controller, and (iii) at least one uplink TDM switch in a first different controller of the plurality of controllers, and wherein the uplink TDM switch is configured to:
         receive a first TDM cell based on signals received from the first radio head, wherein the first TDM cell comprises a first plurality of TDM data slots, and wherein a destination of each of the first plurality of TDM data slots is predetermined;
         generate a second TDM cell based on the first TDM cell, wherein the second TDM cell comprises a second plurality of TDM data slots, and wherein a destination of each of the second plurality of TDM data slots is predetermined;
         forward data bits in a first slot of the first plurality of TDM data slots to the BBU in the controller; and
         forward data bits in a second slot of the first plurality of TDM data slots in the second TDM cell to the at least one uplink TDM switch in the first different controller; and
      a downlink TDM switch coupled to (i) the first radio head, (ii) the BBU in the controller, and (iii) at least one downlink TDM switch in a second different controller of the plurality of controllers, and wherein the downlink TDM switch is configured to:
         generate a third TDM cell based on digital signals received from the BBU in the controller, wherein the third TDM cell comprises a third plurality of TDM data slots; and
         for each TDM data slot in the third TDM cell, forward data bits in the TDM data slot to either the first radio head or to the at least one downlink TDM switch in the second different controller.

2. The system of claim 1, wherein the uplink TDM switch is configured to forward data bits in the second slot of the first plurality of TDM data slots to the at least one uplink TDM switch in the first different controller through an I/O interface.

3. The system of claim 1, wherein the uplink TDM switch and the downlink TDM switch are coupled to the first radio head through a same I/O interface.

4. The system of claim 1, wherein the uplink TDM switch and the downlink TDM switch are the same switch.

5. The system of claim 1, wherein the destination of each of the first plurality of TDM data slots is predetermined based on bit positions of the data slots in the first TDM cell.

6. The system of claim 1, wherein each of the plurality of controllers is configured to provide part or all of a digital part of a physical (PHY) layer function and a media access control (MAC) layer function of an access point (AP) without providing a analog part of the PHY layer function of the AP.

7. An integrated circuit, comprising:
   a baseband unit (BBU);
   an uplink time-division multiplexing (TDM) switch coupled to (i) at least a first radio head, (ii) the BBU in the integrated circuit, and (iii) at least one uplink TDM switch in a first different integrated circuit, and wherein the uplink TDM switch is configured to:
      receive a first TDM cell based on signals received from the first radio head, wherein the first TDM cell comprises a first plurality of TDM data slots, and wherein a destination of each of the first plurality of TDM data slots is predetermined;
      generate a second TDM cell based on the first TDM cell, wherein the second TDM cell comprises a second plurality of TDM data slots, and wherein a destination of each of the second plurality of TDM data slots is predetermined;
      forward data bits in a first slot of the first plurality of TDM data slots to the BBU in the integrated circuit; and
      forward data bits in a second slot of the first plurality of TDM data slots in the second TDM cell to the at least one uplink TDM switch in the first different integrated circuit; and
   a downlink TDM switch coupled to (i) the first radio head, (ii) the BBU in the integrated circuit, and (iii) at least one downlink TDM switch in a second different integrated circuit, and wherein the downlink TDM switch is configured to:
      generate a third TDM cell based on digital signals received from the BBU in the integrated circuit, wherein the third TDM cell comprises a third plurality of TDM data slots; and
      for each TDM data slot in the third TDM cell, forward data bits in the TDM data slot to either the first radio head or to the at least one downlink TDM switch in the second different integrated circuit.

8. The integrated circuit of claim 7, wherein the uplink TDM switch is configured to forward data bits in the second slot of the first plurality of TDM data slots to the at least one uplink TDM switch in the first different integrated circuit through an I/O interface.

9. The integrated circuit of claim 7, wherein the uplink TDM switch and the downlink TDM switch are coupled to the first radio head through a same I/O interface.

10. The integrated circuit of claim 7, wherein the uplink TDM switch and the downlink TDM switch are the same switch.

11. The integrated circuit of claim 7, wherein the destination of each of the first plurality of TDM data slots is predetermined based on bit positions of the data slots in the first TDM cell.

12. The integrated circuit of claim 7, wherein the integrated circuit is configured to provide part or all of a digital part of a physical (PHY) layer function and a media access control (MAC) layer function of an access point (AP) without providing a analog part of the PHY layer function of the AP.

13. A controller, comprising:
   a baseband unit (BBU);
   a memory containing a program that, when executed on the BBU, performs an operation, the operation comprising:

receiving a first TDM cell based on signals received from a first radio head, wherein the first TDM cell comprises a first plurality of TDM data slots, and wherein a destination of each of the first plurality of TDM data slots is predetermined;

generating a second TDM cell based on the first TDM cell, wherein the second TDM cell comprises a second plurality of TDM data slots, and wherein a destination of each of the second plurality of TDM data slots is predetermined;

forwarding data bits in a first slot of the first plurality of TDM data slots to the BBU in the controller;

forwarding data bits in a second slot of the first plurality of TDM data slots in the second TDM cell to at least a first different controller;

generating a third TDM cell based on digital signals received from the BBU in the controller, wherein the third TDM cell comprises a third plurality of TDM data slots; and for each TDM data slot in the third TDM cell, forwarding data bits in the TDM data slot to either the first radio head or to at least a second different controller.

14. The controller of claim 13, wherein forwarding data bits in the second slot of the first plurality of TDM data slots to the first different controller comprises forwarding data bits in the second slot of the first plurality of TDM data slots to the first different controller through an I/O interface.

15. The controller of claim 13, wherein the destination of each of the first plurality of TDM data slots is predetermined based on bit positions of the data slots in the first TDM cell.

16. The controller of claim 13, wherein the controller is configured to provide part or all of a digital part of a physical (PHY) layer function and a media access control (MAC) layer function of an access point (AP) without providing a analog part of the PHY layer function of the AP.

17. The controller of claim 13, wherein the controller is disposed in a chassis external to the first radio head.

* * * * *